W. DOTY.
Fruit-Gatherer.
No. 18,503.
Patented Oct. 27, 1857.
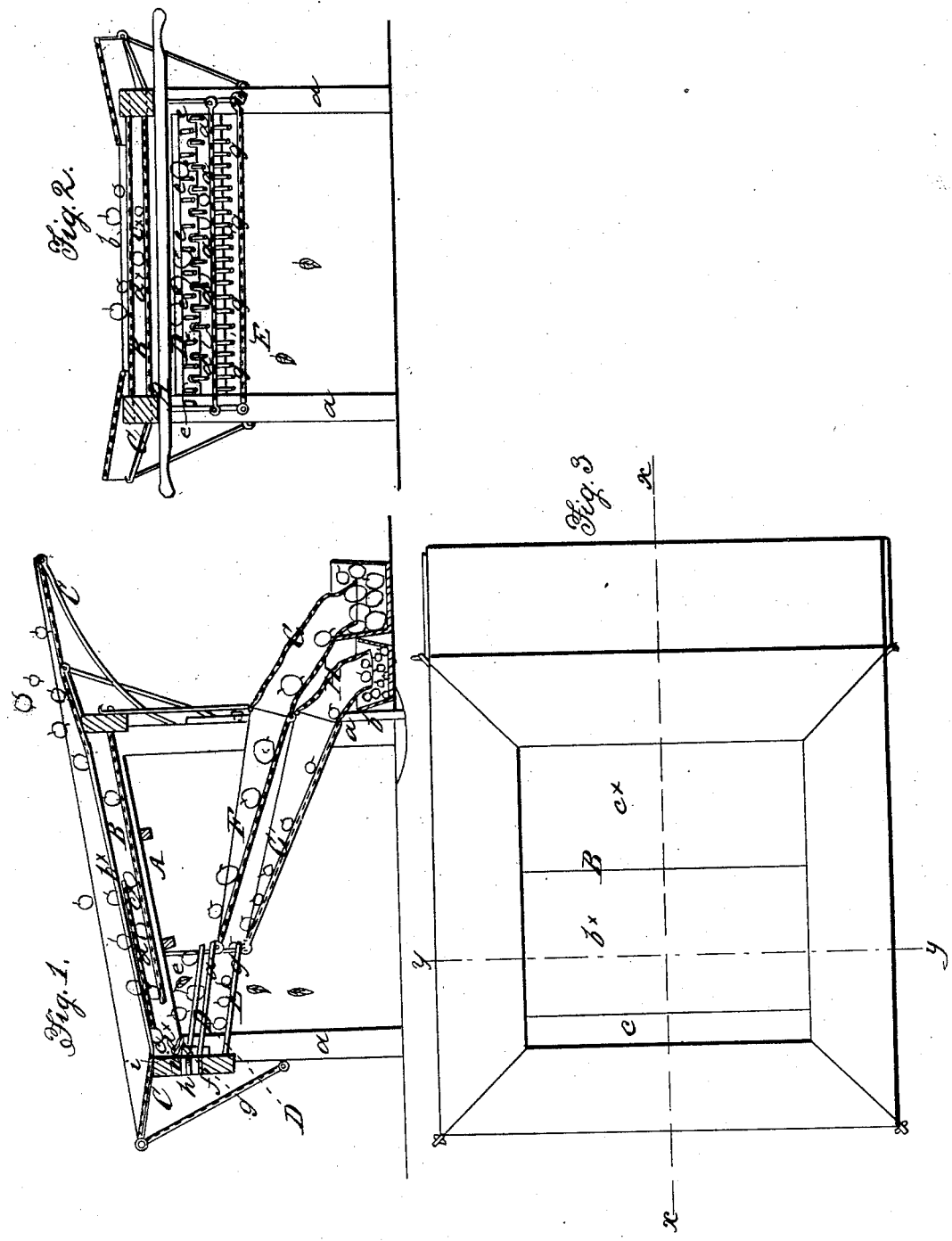

UNITED STATES PATENT OFFICE.

WILLIAM DOTY, OF SOUTH HARTFORD, NEW YORK.

IMPROVEMENT IN FRUIT-GATHERERS.

Specification forming part of Letters Patent No. 18,503, dated October 27, 1857.

*To all whom it may concern:*

Be it known that I, WILLIAM DOTY, of South Hartford, in the county of Washington and State of New York, have invented a new and Improved Device for Gathering and Assorting Fruit; and I do hereby declare that the following is a full, clear, and exact description of the same, reference being had to the annexed drawings, making a part of this specification, in which—

Figure 1 is a longitudinal vertical section of my improvement, taken in the line $x\,x$, Fig. 3. Fig. 2 is a transverse vertical section of the same, taken in the line $y\,y$, Fig. 3. Fig. 3 is a plan or top view of the same.

Similar letters of reference indicate corresponding parts in the several figures.

The object of this invention is to expedite the gathering of fruit, apples, and such kinds that grow on large trees, and which are now picked by hand.

The invention is more especially adapted to the harvesting and assorting of apples. The harvesting and assorting of this fruit is attended with great labor. Each one is picked by hand—that is, those intended for winter use—for if they be shaken off upon the ground they are bruised and soon decay. They are also assorted as they are picked.

The invention consists in having an inclined apron, placed on a suitable frame, and using in connection therewith screens and conveying-spouts, arranged as will be hereinafter described, whereby the apples may, without the least injury, be shaken from the tree and perfectly assorted.

To enable those skilled in the art to fully understand and construct my invention, I will proceed to describe it.

A represents an inclined frame placed on the top of four supports $a$. The frame A is covered with an apron, B, of any suitable woven fabric, the apron being stretched over the frame. The frame A may be encompassed by a wire frame, C, so that the cloth may extend considerably beyond the frame A; or the frame A may be made of sufficient area, so that the supplementary frame may be dispensed with. Two of the supports $a$ may have slides $b$ attached, so that the proper inclination may be given the frame when the supports are on uneven ground. A space, $c$, extending the whole width of the frame A, is made at the depressed end of the apron B, as shown clearly in Fig. 1. This space should be sufficiently wide to allow the fruit to pass through it.

D represents a screen, which is formed of two sets of inclined wires, $d\,e$, one set being above the other. The lower wires, $d$, are secured permanently in the end piece, $f$, of the frame A, and the upper wires, $e$, are secured in a strip or bar, $g$, which may be adjusted vertically and secured at any desired point by set-screws $h$, said screws passing through slots $i$ in the end piece, $f$. The wires $e$, therefore, in consequence of being adjustable, may be placed nearer to or farther from the wires $d$, and the screen $d$, therefore, may be made coarser or finer, as desired.

E is a screen which is placed below the screen D. The wires $g$ of the screen E are stationary, and are parallel with the wires of the screen D. Both screens are inclined in a reverse direction to the apron B, as shown clearly in Fig. 1.

F is a trough, which may be formed of cloth placed around a frame. This trough is inclined, and its upper end is connected with the lower end of the screen D. To the lower end of the trough F a flexible spout, G, is attached.

G' is a trough, which is constructed precisely similar to the trough F. The trough G' is connected at its upper end with the screen E. The lower end of the trough G' has also a flexible spout, H, attached.

The device is used as follows: The implement is placed underneath a tree the fruit of which is to be gathered, and the branches directly over the apron B are shaken. The fruit will fall upon the apron, which, in consequence of its material and yielding property, will not bruise the fruit, and the fruit will roll down the inclined apron and fall upon the upper screen, D. The large fruit cannot pass between the wires $e\,d$ of this screen, and will consequently roll down the trough F and into the spout G. The small fruit will pass between the wires $e\,d$ and fall on the screen E and roll down the trough G' into the spout H. Leaves, stems, and foreign substances pass through the screen E. Fruit that are large and do not approach a spherical form will lodge between the wires of the screen D. These may be removed by hand and placed in a receptacle by themselves, as in the generality of cases good-formed as well as good-sized fruit is required.

If, however, form is not considered important, the screen D may be sufficiently inclined to allow such to pass down into the spout G.

I would remark that the lower ends of the spouts G H may be closed so as to retain the fruit, and when filled they may be emptied into proper receptacles. By this means the fruit will not be bruised, as it otherwise would be by falling directly into the tubs or barrels.

The wires $e$ of the screen D are adjusted according to the size of the fruit to be gathered, and a pad or cushion, $a^x$, should be placed over the bar or strip $g$ to prevent the fruit being bruised as they fall off the apron B upon the screen D.

I would further remark that the apron B may be formed of two parts, $b^x$ $c^x$, and made to overlap each other, so as to leave a space, $d^x$, between. By this arrangement two passages are allowed for the fruit, so that the fruit falling upon the highest part of apron B by passing into the space $d^x$ would be free from all danger of being injured by the fruit which might be falling directly over it.

The device of course is moved entirely around the tree, and all the branches are shaken over it and the fruit detached therefrom. By this device the fruit is harvested and assorted very expeditiously and in a perfect manner.

I am aware that screens and troughs have been used in various ways for screening articles and conveying them to proper receptacles, and I therefore do not claim broadly inclined screens and troughs separately and irrespective of the arrangement herein shown; but,

Having thus described my invention, what I claim as new, and desire to secure by Letters Patent, is—

The combination of the apron B, stretched or placed over the frame A, the screen D, formed of the adjustable and stationary wires $e$ $d$, and the inclined troughs F G', the whole being arranged as shown, for the purpose specified.

WILLIAM DOTY.

Witnesses:
  CHESTER INGALLS,
  E. W. LORELAND.